Figure 1:
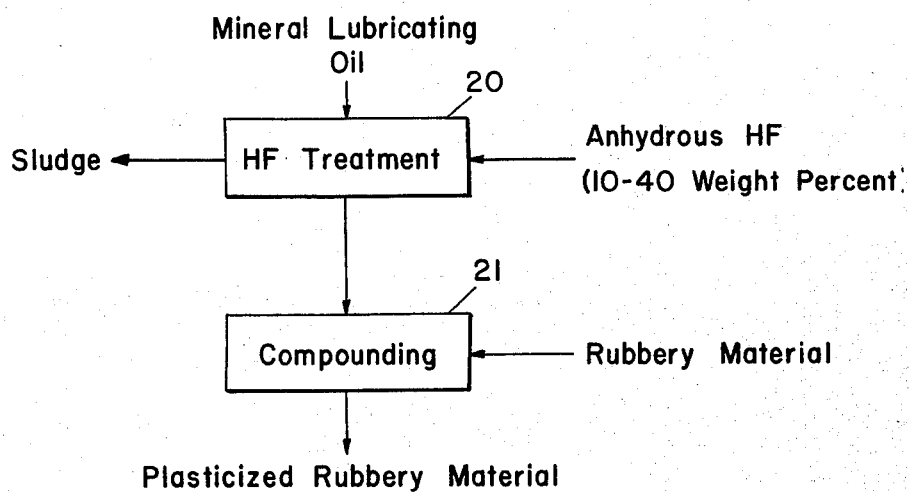
Figure 2:
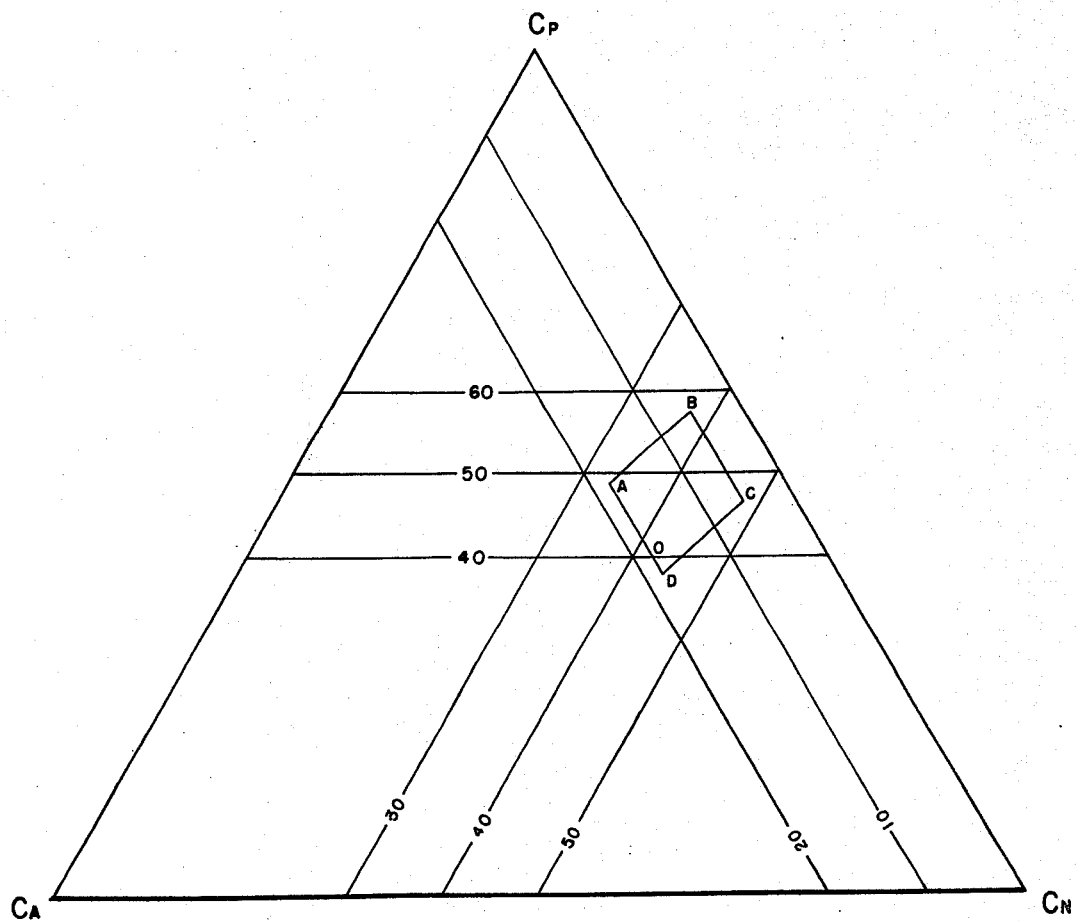

United States Patent [19]

Schneider et al.

[11] B 3,985,701
[45] Oct. 12, 1976

[54] RUBBER CONTAINING ACID-TREATED OILS AND ITS PREPARATION

[75] Inventors: Abraham Schneider, Philadelphia; Archibald P. Stuart, Media, both of Pa.

[73] Assignee: Sun Oil Company of Pennsylvania, Philadelphia, Pa.

[22] Filed: May 29, 1967

[21] Appl. No.: 657,438

[44] Published under the second Trial Voluntary Protest Program on January 20, 1976 as document No. B 657,438.

Related U.S. Application Data

[63] Continuation of Ser. No. 547,670, May 4, 1966, which is a continuation of Ser. No. 186,825, April 6, 1962, abandoned, which is a continuation of Ser. No. 822,155, June 22, 1959, abandoned, which is a continuation-in-part of Ser. No. 409,478, Feb. 10, 1954, abandoned.

[52] U.S. Cl. .......................... 260/33.6 AQ; 208/14; 208/280
[51] Int. Cl.² ...................... C08K 5/01; C10G 17/02
[58] Field of Search ............ 260/33.6 AO, 33.6 AQ; 208/23, 13, 14, 280

[56] References Cited
UNITED STATES PATENTS
2,449,463  9/1948  Evering et al. .......................... 196/13
2,778,807  1/1957  Boggs et al. .......................... 260/33.6

Primary Examiner—M. J. Welsh
Assistant Examiner—H. H. Fletcher
Attorney, Agent, or Firm—J. Edward Hess; Donald R. Johnson; Paul Lipsitz

[57] ABSTRACT

A novel oil-containing rubber composition is prepared by admixing a rubber from the group consisting of natural rubber, homopolymers of conjugated diolefins, and copolymers of conjugated diolefins with ethylenically unsaturated monomers, with mineral oil having at least 10 weight percent aromatic compounds which has been obtained by a. mixing a mineral oil starting material with an acidic reagent comprising anhydrous hydrogen fluoride in amount from 10 to 40 percent by weight of said starting material; thereby to form an acid phase insoluble in said mineral oil and containing components extracted from said starting material, and an oil phase comprising unextracted components of said starting material and containing dissolved acidic material, b. separating said acid phase from said oil phase, c. mixing said oil phase with an alkaline reagent to neutralize said dissolved acidic material and form neutralization products, and d. separating said neutralization products from said oil phase.

2 Claims, 5 Drawing Figures

INVENTOR.
ABRAHAM SCHNEIDER
BY ARCHIBALD P. STUART

*Donald R. Johnson*
ATTORNEY

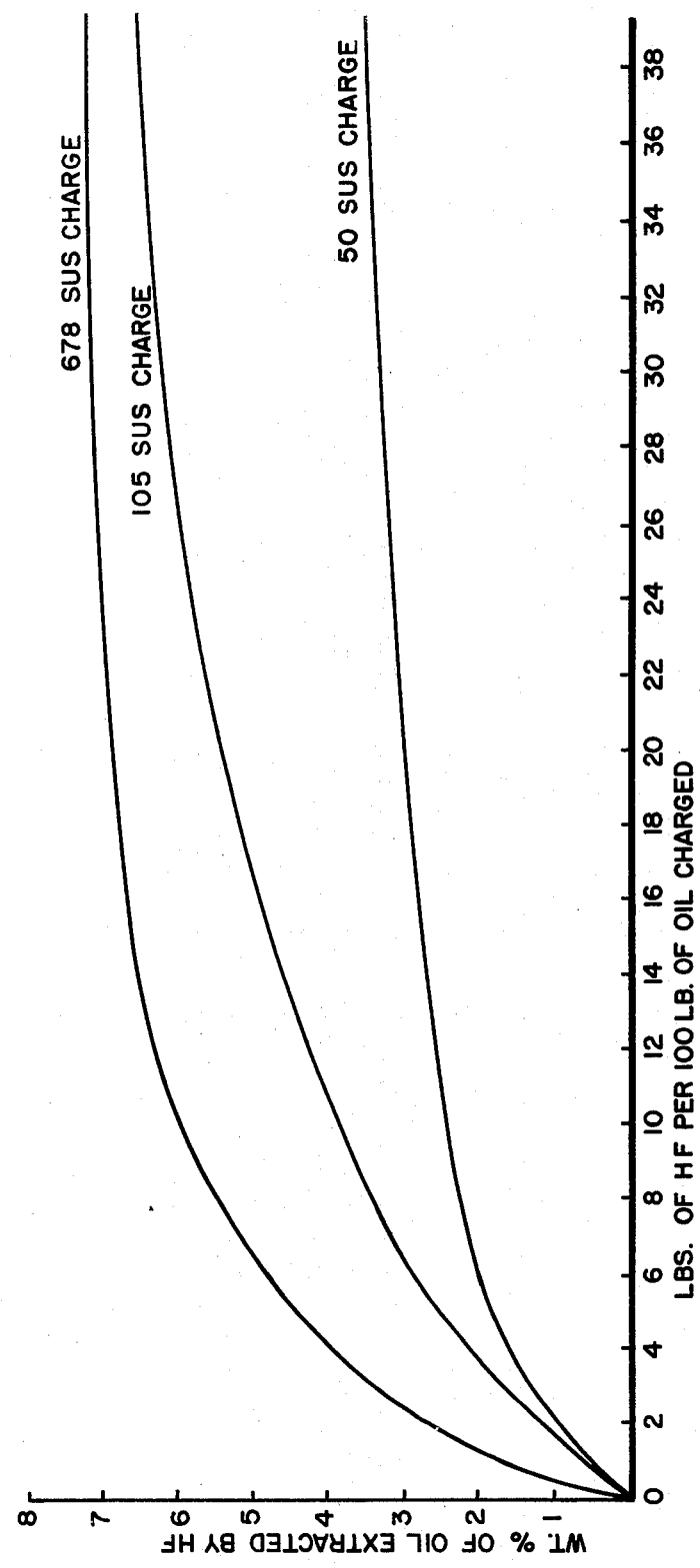
FIGURE III
AMOUNT EXTRACTED BY HF FROM NAPHTHENIC DISTILLATES OF VARIED VISCOSITY AS A FUNCTION OF THE PROPORTION OF HF

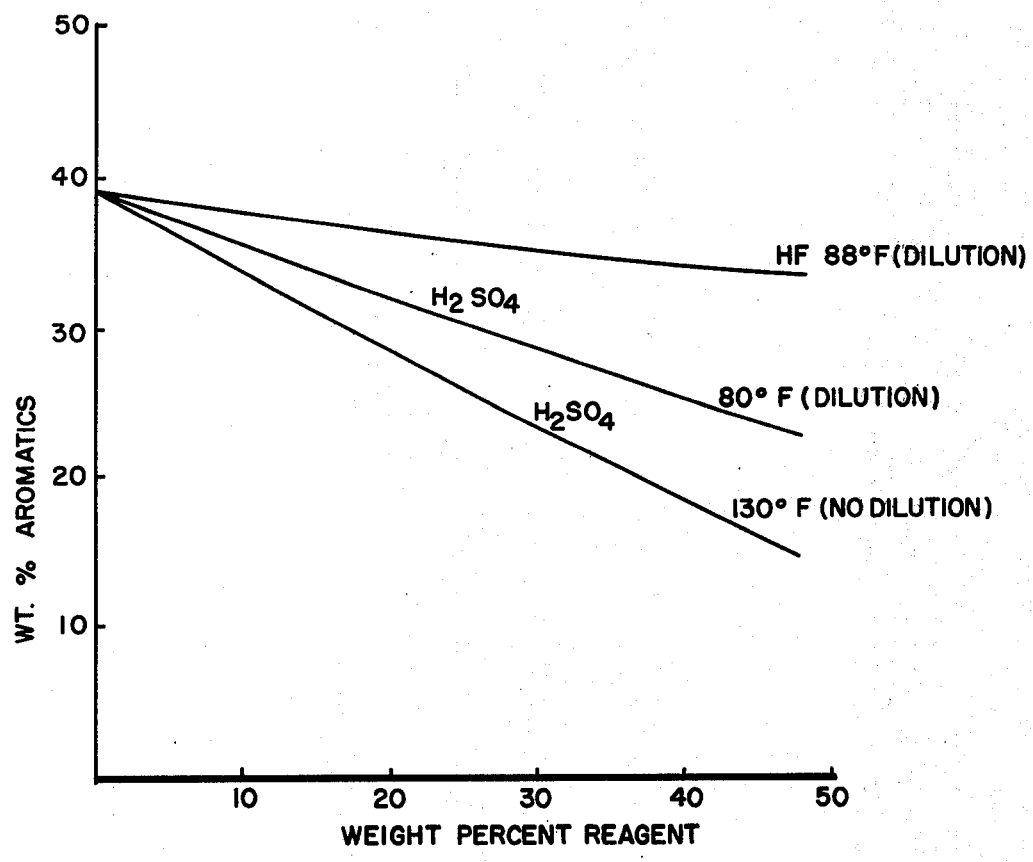
AROMATIC CONTENT OF RUBBER PROCESS OILS AS A
FUNCTION OF TREATING REAGENT AND DOSAGE
FIGURE IV

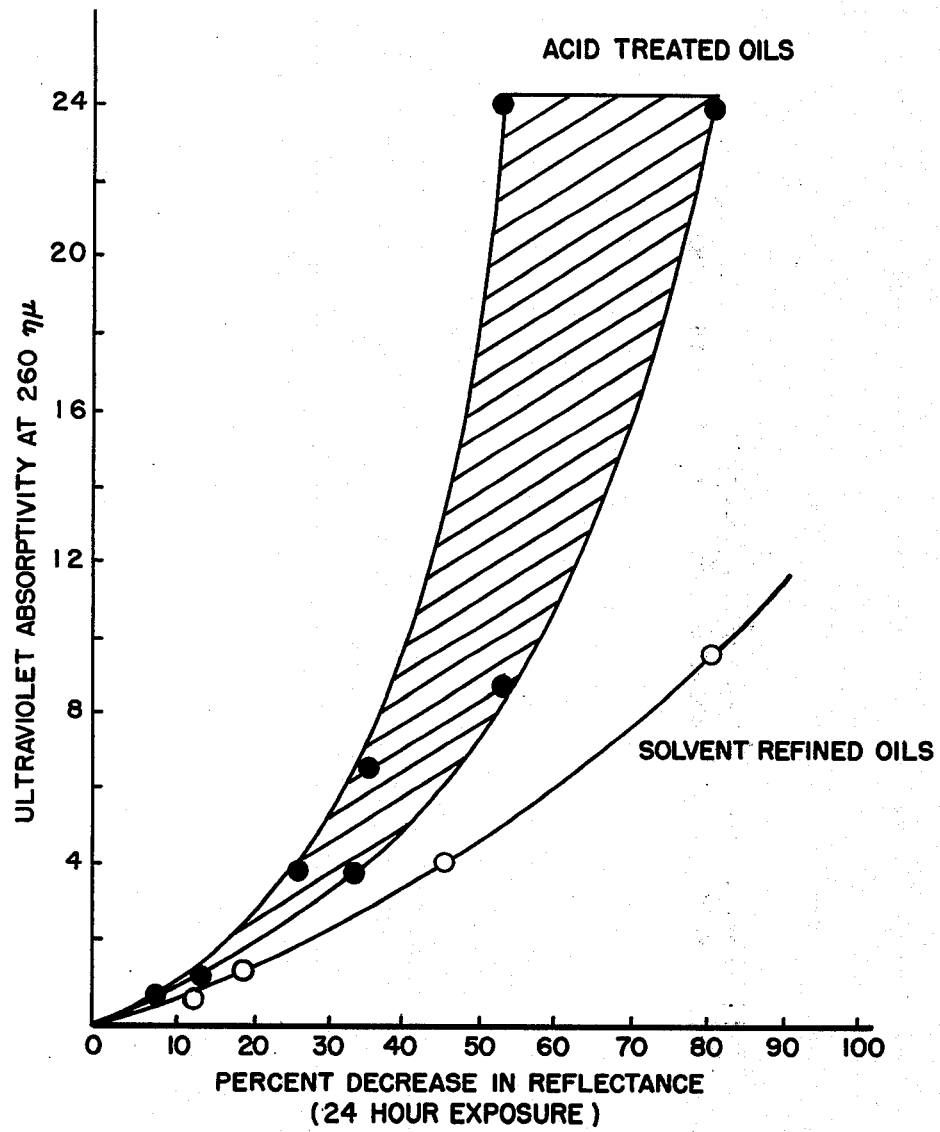

RUBBER CONTAINING ACID-TREATED OILS AND ITS PREPARATION

CROSS REFERENCES TO RELATED APPLICATIONS

This application is a continuation of application Ser. No. 547,670, filed May 4, 1966, which was a continuation of application Ser. No. 186,825, filed Apr. 6, 1962, now abandoned which was a continuation of application Ser. No. 822,155, filed June 22, 1959, now abandoned, which was a continuation-in-part of application Ser. No. 409,478, filed Feb. 10, 1954 and now abandoned.

BACKGROUND OF THE INVENTION

This invention relates to improved natural and synthetic rubber compositions, and to methods for preparing the same.

It is known in the art to employ mineral oil as a plasticizer or extender for rubbery materials including both natural rubber and synthetic rubber such as butadiene polymers and interpolymers, etc., and such oils generally impart highly satisfactory properties to the rubbery material in question. However, rubbery materials plasticized with mineral oil plasticizers of the prior art exhibit a disadvantageous tendency to stain materials adjacent to the rubbery material. Furthermore, in the case of light-colored rubber products, e.g., white sidewall tires for automobiles, footwear, etc. rubbery materials plasticized with prior art mineral oil plasticizers show a disadvantageously poor color stability, particularly upon aging in bright sunlight.

SUMMARY OF THE INVENTION

The present invention provides a novel rubbery composition containing mineral oil as plasticizer or extender and having excellent color stability and non-staining properties. According to the present invention, compositions are provided which comprise rubbery material, i.e., either natural or synthetic rubber, and mineral oil from which a minor portion of the aromatic hydrocarbons and a major portion of the heterocyclic nitrogen, oxygen, and sulfur compounds containing aromatic nuclei have been removed by acid treating, the oil containing, after such removal, at least 10 weight percent, and preferably at least 20 weight percent, of aromatic compounds, i.e., compounds containing an aromatic ring or rings. Preferably, the product from HF-treatment of a naphthenic distillate or of a solvent extract of a naphthenic distillate contains not more than 45 weight percent of aromatic compounds. Preferably, the treated oil contains less than 3% of polar aromatic compounds by ASTM D2007-62T clay-gel analysis (and, more preferably, less than 1.0%).

In some cases, it is desirable to obtain a product having as high an aromatic content as possible within a range, e.g., 20 to 45 percent, while still obtaining sufficient removal of non-hydrocarbon compounds which would otherwise cause color and staining problems. The process of the present invention is advantageous in such cases in that it provides superior selectivity for removal of the color and staining components (i.e., heterocyclic aromatic compounds containing nitrogen, sulfur or oxygen), and the product has higher aromatic hydrocarbon content at a given color and staining level than it is possible to obtain by refining procedures such as solvent extraction and/or the usual $H_2SO_4$ treatment.

The rubber product of our invention will frequently have a lighter initial color than rubber containing the same amount of the prior art rubber process oils of equivalent aromatic content since such prior art rubber process oils have a greater tendency to discolor when heated in the presence of an oxidizing agent (as during compounding of the oil with the rubber).

These advantages are obtained to the greatest extent when solvent extraction is not performed at any stage of the treatment. However, it is sometimes advantageous to use both acid treating and solvent extraction. In this embodiment, any of the well known selective solvents for aromatics can be employed, e.g., furfural, phenol, sulfur dioxide, nitrobenzene, B,B'-dichloroethyl ether, etc. Temperatures of 100° to 250°F. and solvent-to-oil ratios of 1–4:1 are preferred. Extract yield is usually 10 to 30 weight percent of charge. Other conditions and yields are contemplated in some cases. Highly aromatic, non-discoloring rubber process oils (e.g., 45–90% aromatics) can be prepared from such extracts by a sufficiently severe HF-treatment to reduce the polar aromatic content of the product oil to less than 3 percent.

Frequently such a combination of solvent extraction and acid treatment is less expensive than the use of acid treatment alone to produce an oil of given aromaticity and color stability, because the more aromatic oil recovered from a solvent extract has a better market value than the residue from acid refining. Such a combined process allows the production (from the raffinate) of a more stable oil of given aromatic content than can be produced solely by extraction with an aromatic selective solvent, such as furfural, $SO_2$ or phenol.

It is sometimes also economically advantageous to acid treat a hydrorefined or hydrotreated naphthenic distillate (or a furfural raffinate of such a distillate) since such a hydrogenation step will appreciably reduce the sulfur and nitrogen content of the charge, and, thus, decrease acid consumption.

It is characteristic of extraction with an aromatic selective solvent (within the ranges of temperature and solvent-to-oil ratio practiced by the prior art) that the solvent extracts the desirable aromatic hydrocarbons along with the undesirable polar aromatic compounds. After a given degree of aromatic removal has been obtained by solvent extraction, further extraction results in a more selective removal of the desirable aromatic hydrocarbons from the raffinate and the relative polar aromatic content of the refined raffinate oil will not decrease. In fact, in such a "deeper" raffinate the ratio of polar aromatics to total aromatics can increase. For example, furfural extraction of a 2400 SUS (at 100°F.) distillate containing 47.5% aromatics (260 UVA of 11) and 2.7% polar compounds can product a 1200 SUS oil containing 31.6% aromatics (260 UVA of 2.5) and 1.0% polar compounds.

A second extraction of this product (or a more deep initial extraction of the distillate) produces a 1000 SUS oil containing 22.5% aromatics (260 UVA of 1.0) and 1.0% polar aromatics. When compounded with rubber these two oils produce substantially the same degree of discoloration when the resulting rubber product is aged in the presence of ultraviolet light.

In contrast, when the 31.6% aromatic content product is treated with 10 lbs. of HF per 100 lbs. of oil, the resulting product contains 31.2% aromatics and 0.5% polar compounds. When this acid-treated, furfural raffinate (which has a composition within the area ABCD of FIG. 11) is compounded (1:5 parts by weight) with rubber and in a "white" formulation, the rubber (after vulcanization) is aged in the presence of ultraviolet light, appreciably less discoloration of the rubber product is observed than is observed upon aging similar rubber products containing either of the above described furfural raffinates. The initial color of the rubber vulcanizate containing this HF-treated furfural raffinate is also lighter than that of a similar rubber vulcanizate containing an equal weight of a 31.2% aromatic oil blended from the two raffinates described above.

Similarly, when a furfural raffinate of a 100–10,000 SUS petroleum distillate is further treated with a sulfonating agent (e.g., $SO_3$, $H_2SO_4$, oleum, chlorosulfuric acid) in an amount equivalent to from 3–40 lbs. of $SO_3$ per barrel (preferably 10–30 lbs./bbl.) the resulting refined oil will have a lower ratio of polar aromatics to total aromatics than did the untreated raffinate, and rubber products containing the resulting refined oil will exhibit better color stability on exposure to ultraviolet light than will similar rubber products containing the untreated raffinate.

Another useful embodiment of an acid treatment of an aromatic-containing raffinate (or of a hydrorefined distillate) is to combine the production of sulfonated hydrocarbons with the production of rubber process oils, as by treating a 38–48% aromatic raffinate of an 800 SUS (at 100°F.) naphthenic distillate with 20% by weight of oleum (120% $H_2SO_4$) at 150°F., removing the sludge, contacting the sludge-free oil with alcohol and separating the resulting sulfonic acid and alcohol layer from the oil layer. These two layers can be further refined by conventional means to produce sulfonic acids and a non-discoloring rubber process oil containing 15–22% of aromatics and having a 260 UVA no greater than 1.0. Hydrorefined distillate of equivalent total aromatic content can be used in place of the raffinate feed.

DESCRIPTION OF THE INVENTION

Anhydrous hydrogen fluoride is employed to treat the oil which is to be used in rubber compounding. The amount of hydrogen fluoride employed should be within the range from 10–40 weight percent based on the oil, i.e., 10–40 pounds of hydrogen fluoride per 100 pounds oil. The amount should be at least 10 percent in order to obtain substantial removal of non-hydrocarbon constituents of the oil, and need not be greater than 40 percent.

A single treatment with hydrogen fluoride may be employed, or a plurality of treatments with hydrogen fluoride with separations of sludge between treatments. In the latter manner of operation, a smaller total amount of hydrogen fluoride generally is required to obtain a given degree of treatment than in the case of a single treating stage.

The sludge obtained from such HF treatment differs from the sludge obtained from $H_2SO_4$ treatment of a petroleum distillate in that the reaction of the HF and the polar aromatics is readily reversible and S, N and O compounds of the sludge can be recovered therefrom by distilling the sludge to remove (and recover) HF. The so-recovered S, N and O compounds appear to be essentially the same as those present in the original oil charge (e.g., the boiling range of the polar compounds recovered from HF-sludge is essentially the same as that of the charge oil).

In contrast it is very difficult and expensive to recover $H_2SO_4$-sludge and such recovery methods (as by pyrolysis) destroy or greatly alter the organic portion of the sludge.

The temperature employed is generally within the range from 50°F. to 200°F., higher temperatures generally being used in the case of the more viscous oils to provide good contact. With the more viscous oils (700–10,000 SUS at 100°F.) dilution with a lower boiling, less viscous solvent (which will not react with HF), as isooctane, aviation alkylate, or n-heptane, advantageously can be used to improve contact at the lower temperatures. The pressure used is advantageously that of the hydrogen fluoride at the temperature employed, the operation being conducted with the hydrogen fluoride in liquid phase.

The mineral oil from which aromatics have been removed, and which contains at least 10 percent of aromatic compounds, has been found to be highly satisfactory for use as a processing oil in the preparation of rubber compositions, particularly in compositions where non-staining properties are important. The oil is compatible with rubber in amounts sufficient to provide the desired plasticization in many applications of oil-plasticized rubbers.

The mineral oil employed according to the invention preferably has a viscosity at 100°F. of at least about 100 SUS. Normally liquid mineral oil fractions having considerably higher viscosities, e.g., up to 300 SUS at 210°F. or higher, can also be used. Usually the more highly viscous the oil, the greater the amount of non-hydrocarbon impurity (i.e., polar aromatics which must be removed by HF-treatment in order to produce a non-discoloring rubber process oil.

The amount of heterocyclic nitrogen, oxygen and sulfur compounds (or polar aromatic compounds) removed from distillates or raffinates according to the present invention is usually in the range from 2 to 15 weight percent (based on the oil), which normally corresponds to a decrease in the total aromatic content of the oil of from 4–30 weight percent, of the total "gel" aromatics originally present. Thus, for example, if the oil prior to HF treating contains 45 percent aromatics, and 14 weight percent of the oil is removed in the HF treating, the amount of aromatics (i.e., polar compounds) removed is about 31 percent of the total aromatics (polar aromatics and aromatic hydrocarbons) originally present, again assuming that only aromatics are removed.

The proportion of the charge oil which must be extracted by HF treatment in order to produce a non-discoloring rubber process oil will be greatest with distillates obtained from crude oils having a high content of sulfur, nitrogen and oxygen. Generally solvent refining as disclosed herein will reduce the HF-extractable content of the resulting raffinate by from 30–80% (usually by about 50%); however, in every case, acid treatment can be used to produce an oil with a lower content of polar aromatics at a given total aromatic content than can be produced by the prior art extractions with aromatic selective solvents, such as furfural, phenol or $SO_2$.

Preferably, when naphthenic distillates are used as the charge, they should be substantially free of naphthenic acids, (such as the oils of U.S. Pat. Nos. 1,603,174; 2,770,580; 2,795,532; 2,966,456 and 3,080,312), otherwise the proportion of HF extractables will increase. With HF-treatment and efficient phase segregation, oil extractions as high as 14 or 15 percent of the charge are found only with the more highly colored and highly viscous (2500–10,000 SUS at 100°F.) naphthenic distillates of high sulfur and nitrogen content. With 50–2500 SUS distillate or raffinate oils it is more usual to extract from 2 to about 10% of the charge oil. If greater losses are encountered, they can be reduced by lowering the treatment temperature and/or improving the technique utilized in the separation of the treated oil phase from the HF-extract phase. Hydrorefining or hydrotreatment can also be used, prior to acid treatment to reduce the quantity of acid-extractable material.

In a naphthenic distillate oil of about 800 SUS at 100°F., typical HF extraction removes about 7% of the total charge and this amount of aromatics removed is about 16% of the total aromatics originally present. If the distillate is extracted with furfural, the 70–90% raffinate will contain from 3–4% of polar compounds which can be extracted by HF.

When the charge which is contacted with HF is not a distillate, but consists of a residuum (such as the residual lubricating oil fraction of U.S. Pat. No. 2,546,916), the amount of oil removed by the HF can be as high as 40%; however, even in this instance the HF treatment is more selective for the undesirable polar compounds of the oil than is $H_2SO_4$ treatment (as evidenced by the higher amounts of oil which are removed by $H_2SO_4$) and either $H_2SO_4$ treatment or HF-treatment can be used to produce an oil which has better UV stability in rubber at a given level of aromaticity than can be produced by solvent extraction alone.

Although it is not usually economical to produce light-colored rubber oils by HF-treatment of residual oils, the HF-treatment described herein can be an economical means of reducing the sulfur content of residual fuels (such as Bunker C) in order to reduce corrosion and air pollution caused by burning high sulfur content fuel. HF treatment can also be used as a pretreatment of high sulfur crude oils prior to their distillation to decrease equipment corrosion. Such additional HF processing in a refinery can greatly improve the economics of HF treatment of distillates to produce rubber oils.

Although the art has believed (e.g. U.S. Pat. No. 2,449,463) that HF will extract polycyclic aromatic hydrocarbons and sulfur, nitrogen and oxygen-containing heterocyclic aromatics, we have found, with distillate fractions of 100–10,000 SUS at 100°F. and having viscosity-gravity constants from 0.84 to 0.94, that 10–40 lbs. of HF per 100 lbs. of oil charged removes only a minor proportion, at most, of the polycyclic aromatic hydrocarbons in the oil charged and that, in comparison with prior art $H_2SO_4$ treatment, or solvent extraction, the HF-treatment is much more selective for the components of petroleum distillates which cause color instability in rubber containing such oils.

In particular HF has the ability to efficiently remove a large part of the sulfur compounds in a naphthenic oil, a function which sulfuric acid does not possess. Therefore, in comparison with $H_2SO_4$-treated oils, HF-treated electrical oils have a poorer aged resistivity, due to the removal of the sulfur compounds which, it is believed, are natural oxidation inhibitors. Although, due to the removal of these sulfur-containing natural inhibitors, HF-treated naphthenic oils do not make good electrical oils, such HF-treated oils, surprisingly, when compounded with rubber can be used to produce non-discoloring rubber products. That is, at a given level of aromatic content, an HF-treated naphthenic oil can be used to produce a light-colored rubber which is more stable to aging in the presence of sunlight than an oil of comparable aromaticity which is prepared by furfural extraction or by prior art $H_2SO_4$ contacting.

A notable, and surprising, distinction between conventional $H_2SO_4$ treatment of a naphthenic oil and HF treatment is that the amount of oil extracted by $H_2SO_4$ treatment can be as great as 80% of the total oil charged, if a large enough quantity of $H_2SO_4$ (or $SO_3$) is used. In white oil manufacture, $H_2SO_4$ and/or $SO_3$ can be used to remove over 95% of the aromatics in oils.

However, with HF the oil loss tends to level out, and, depending upon the viscosity of the oil and its content of sulfur, nitrogen and oxygen containing compounds, the amount of oil extracted by the HF is rarely greater than 10% of the weight of the oil, regardless of how large an amount of HF is used. For example, in HF-treatment of a 678 SUS (at 100°F.) naphthenic distillate, as illustrated in FIG. III herein, the maximum absorbed oil loss is only about 7%. The curves of FIG. III are illustrative of the results obtainable when 50–1000 SUS (at 100°F.) naphthenic distillates are treated with from 10–40% by weight HF at a temperature from 50°F. to 200°F. When the charge is a raffinate from the solvent extraction of a naphthenic distillate, the maximum HF-extractable material is about 50% of that shown in the Figure.

FIG. IV compares the aromatic content of the oils produced by HF or $H_2SO_4$ treatment (at various dosages) of an 800 SUS (at 100°F.) naphthenic distillate. FIG. IV shows that even at 40 pounds of HF per 100 pounds of oil the decrease in aromaticity is only 13%. In contrast, the $H_2SO_4$-treated oil loses more than 34% of its original aromatic content at a treating level of 40 lbs. of $H_2SO_4$ per 100 lbs. of oil (at 80°F. with 2:1 dilution of the oil with isooctane). With no dilution and at a higher treating temperature, 130°F., which is more representative of the usual commercial practice, 54% of the original aromatic content is removed by the 40 lbs. of $H_2SO_4$.

An explanation for the results shown in FIGS. III and IV is that HF extracts primarily the polar, heterocyclic oxygen, sulfur or nitrogen compounds in the oil (and, perhaps, some of the more highly condensed aromatic compounds, such as those containing 4 or more condensed rings); whereas, the sulfuric acid (or $SO_3$) reacts with the aromatic hydrocarbons in the oil, in addition to extracting the polar heterocyclic compounds.

Due to the nonselectivity of the conventional $H_2SO_4$ treatment (high temperature, no dilution), in comparison with HF treatment, at a given aromatic level the HF-treated oil will contain a lower proportion of polar aromatic compounds and, therefore, will produce less discoloration in light-colored rubber vulcanizate.

HF treatment is not only more selective for the polar aromatic compounds in the oil, but it is also more efficient in the removal of these compounds than is the prior art treatment with $H_2SO_4$. For example, HF is unquestionably a more efficient desulfurizing agent than 93–99% $H_2SO_4$. Treatment of an SAE 30 (700 SUS at 100°F.) naphthenic distillate with five pounds of 99% $H_2SO_4$/bbl. and subsequent contacting with attapulgite leaves a residual sulfur content of 0.22 weight percent. A two-stage $H_2SO_4$ treatment (20 lbs. of 93% $H_2SO_4$/bbl. followed by 20 lbs. of 99% $H_2SO_4$/bbl.) and finishing by perculation through attapulgite leaves 0.17 weight percent of sulfur in the oil. In contrast, single treatment of samples of the same base oil, having an original sulfur content of 0.28%, with from 12 to 25 weight percent of HF produces an oil containing 0.12 to 0.14 weight percent S. By the use of double treatment involving a total of from 12 to 25 weight percent of HF it is possible to reduce the sulfur content of the oil from the original value of 0.28 to the vicinity of 0.10 to 0.05 weight percent.

That acid treatment, whether by $H_2SO_4$ or HF, produces oils which produce different rubber compositions from compositions containing solvent refined oils is shown by FIG. V. FIG. V compares the 260 UVA (a measure of aromaticity) of a number of petroleum derived rubber processing oils and the change in reflectance upon UV aging, in the test procedure described herein, of light-colored rubber compositions containing 20 parts of the oil per 100 parts of rubber. The curve drawn through the light-colored points represents performance of solvent refined distillate oils (having no acid treatment) and the shaded area bounded by the curves through the dark points represents performance of Lewis acid-refined (HF, $BF_3$, $AlCl_3$, $HF-BF_3$, $SbCl_3$, $SbCl_5$ or $H_2SO_4$) oils. No distinction is made in the Figure between the performance of oils produced by each method of acid treatment or between oils obtained by acid treatment of a distillate versus acid treatment of a raffinate; however, the left hand side of the shaded area is more representative of the results obtainable by HF treatment, as disclosed herein, than the right hand side (which is more representative of the results obtainable with the usual $H_2SO_4$ treatment, e.g., above 90°F. and with no dilution).

The curves of FIG. V indicate that the light-colored oil-containing rubber compositions of our invention will have a greater reflectance after aging for 24 hours in the presence of ultraviolet light under test procedure A than will a similar rubber composition containing a solvent raffinate oil of equivalent aromaticity which is prepared by prior art procedures and has not been further treated with an inorganic Lewis acid. The curves also indicate that, for rubbers containing equal quantities of oils having the same 260 UVA (thus, of about equal plasticity), compositions containing solvent raffinate oils will be from 20% (at about 2 UVA) to 125% (at about 12 UVA) darker in color after the test aging than will the compositions of our invention.

A particularly advantageous use of the oil in question is in GR-S white rubber formulations. Such formulations are in general known in the art and may contain a butadiene-styrene interpolymer prepared by special known methods to obtain properties suitable for preparation of white rubber stocks. The white rubber formulas also generally contain a minor amount, e.g., 25 parts by weight per 100 of GR-S, of a material, e.g., titanium dioxide, imparting a white color to the compounded rubber. Other known rubber compounding ingredients may be present, such as fillers, sulfur, vulcanizing accelerators, etc. According to the present invention, a mineral oil from which polar aromatics have been removed as specified may be employed in such white rubber formulations, employing generally 5 to 30 parts by weight of oil per 100 parts of polymer.

The mineral oil herein specified may also be used in other synthetic rubber compositions such as butadiene polymers and interpolymers with other monomers, such as acrylonitrile, etc.; polymers of isoprene, chloroprene, and other butadiene derivatives, alone or interpolymerized with other monomers, etc. The mineral oil specified may also be used in natural rubber compositions.

The invention will be further described with reference to the attached drawings, in which FIG. I illustrates preparation by a treatment with hydrogen fluoride, and in which FIG. II is a triangular diagram showing preferred compositions of mineral oils for use in the plasticized compositions according to the invention.

Turning now to FIG. I, mineral oil is introduced into anhydrous HF treating zone 20 and contacted therein with, for example, 20–25 parts by weight of anhydrous hydrogen fluoride per 100 parts of oil, at a temperature of about 50°F. Sludge is separated, and the oil is washed with water and caustic by means not shown. The washed oil is then introduced into compounding zone 21 wherein it is compounded with rubbery material.

The oil introduced into compounding zone 21 may contain for example about 23% aromatics. Its compatibility with rubbery material, e.g., GR-S, is sufficiently good to provide for example a white rubber composition containing 20 parts of oil, 100 parts of GR-S, 60 parts of zinc oxide, 25 parts of titanium oxide, 15 parts of calcium carbonate, and 3.75 parts of other compounding ingredients.

The plasticized rubbery material produced by the illustrated preparations is highly satisfactory from the standpoints of plasticization, color stability, and non-staining properties.

Turning now to FIG. II, the coordinates of the diagram are $C_P$, $C_A$, and $C_N$ which represent, respectively, percent paraffinic carbon atoms, percent aromatic carbon atoms, and percent naphthenic carbon atoms, as determined by the n-d-M carbon-type analysis disclosed in the book, *Aspects of the Constitution of Mineral Oils*, by Van Nes and Van Westen (1951) at page 335 et seq. $C_P$, $C_A$, and $C_N$ add up to 100% and are approximations of the proportions in the oil of carbon atoms occurring in, respectively, acyclic chains, aromatic rings, and saturated ring structures.

Preferred plasticizers according to the invention are those which fall within the area ABCD on the diagram. The treatment of a mineral oil fraction according to the invention to obtain a treated oil falling within the area ABCD has been found to produce exceptionally good plasticizers for synthetic rubber. The treated oil obtained in the subsequent Example II contains about 41 percent paraffinic carbon atoms, about 17 percent aromatic carbon atoms, and about 42 percent naphthenic carbon atoms, and its composition is indicated by the circle in the area ABCD on the diagram. The composition of the oil prior to extraction lay outside the area ABCD in the region of the diagram to the left of the line AD.

ILLUSTRATIVE EXAMPLES

The following examples illustrate the invention

EXAMPLE I

Naphthenic-base mineral oil having a viscosity at 100°F. of about 2340 SUS is employed as a plasticizer in a GR-S white wall formulation. The preparation of the oil is as follows; A mineral oil distillate containing about 45 percent aromatics is contacted with agitation with 17.5 parts by weight of anhydrous hydrogen fluoride per 82.5 parts by weight of oil (or 21.2 parts HF per 100 parts of oil) the contacting temperature being 50°–60°C. The pressure is the autogenous pressure of HF at 50°–60°C. After contact for 30 minutes, the mixture is allowed to settle, and the hydrogen fluoride phase is decanted. The oil phase is washed with water and caustic and dried. The hydrogen fluoride phase contains about 11.5 parts of oil, or 14 percent of the charge.

The mineral oil prepared as described above, containing about 36 percent aromatics, is used as a plasticizer in the preparation of the following white rubber composition:

| Component | Parts by Weight |
|---|---|
| Butadiene-styrene interpolymer ("GR-S 66 Special") | 100 |
| Zinc Oxide ("Kadox-15") | 60 |
| N-cyclohexyl-2-benzothiazyl-sulfonamide ("Santocure") | 1 |
| Calcium carbonate ("Atomite") | 15 |
| Titanium dioxide ("Rayox") | 25 |
| Zinc laurate ("Laurex") | 1 |
| Sulfur | 1.75 |
| Mineral Oil | 20 |

The color stability of the compounded rubber is tested by mounting a sample on a board and exposing it on the roof of a building for two weeks. At the end of this period, only slight discoloration of the sample is visible. By way of comparison, the same formulation employing a commercial mineral oil plasticizer for GR-S, which is not solvent-extracted and contains about 47% aromatics, in place of the rubber process oil according to the invention, exhibits a definite and considerably greater discoloration when subjected to the same test.

This example shows that mineral oil which has been treated with 21.2 weight percent of anhydrous hydrogen fluoride based on the oil charged is compatible, in 20 parts per 100 of GR-S, to produce a white rubber product which is superior to a white rubber product containing a commercial mineral oil plasticizer for GR-S.

EXAMPLE II

Two naphthenic-base mineral oil samples (about 800 SUS at 100°F.) are employed as plasticizers in a white GR-S formulation. Sample A is a commercially available rubber oil having about 45 weight percent aromatics. Sample B is HF treated Sample A.

A portion of Sample A is diluted 2 to 1 with alkylate and treated with about 25 weight percent anhydrous hydrogen fluoride, at 80°F. for about 30 minutes. The alkylate is removed by distillation and the residue neutralized with caustic and water. The aqueous layer is removed and the oil phase dried. The oil has an aromatic content of 43 weight percent.

Properties of the two samples are as follows:

| Sample | A | B |
|---|---|---|
| Treatment | no HF | 25 Wt.% HF |
| % by weight aromatics | 45.0 | 43.0 |
| % Polar Aromatics (ASTM D2007) | 5.0 | 2.7 |
| Viscosity/Gravity constant | 0.887 | 0.880 |
| 260 UVA | 9.4 | 8.7 |
| Carbon atom type | | |
| $C_A$ | 20 | 17 |
| $C_N$ | 39 | 42 |
| $C_P$ | 41 | 41 |

Rubber samples are prepared from each of Samples A and B according to the formulation of the following table:

| Compound Formulation | Parts by Weight |
|---|---|
| SBR 1503 | 100 |
| Zinc oxide | 10 |
| Titanium dioxide | 10 |
| Di Cup (Recrystallized dicumyl peroxide) | 2 |
| Oil | 20 |

Oil and other compounding ingredients are added to the polymer as follows:
a. Polymer put on a 3 × 8 inch mill set to a working band.
b. Zinc oxide, titanium dioxide and oil are added.
c. Di Cup is added after oil is completely taken up. Entire milling operation requires 19–23 minutes.
d. Compound is sheeted to 0.10 inches.
e. Sheet is vulcanized 20 minutes at 290°F.
f. On cooling, sample specimens are knocked out with a die to a dimension of 1 × 3.75 × 0.1 inches.

Dicumyl peroxide is employed as the curing agent rather than sulfur, since sulfur imparts a yellow discoloration to the white rubber and somewhat masks the staining, whereas dicumyl peroxide does not.

Color stability of the compounded rubber samples containing the extracted and acid-treated oils is tested by placing the test strips in a test chamber having dimensions 2 × 2 × 2.5 feet and exposed to two RS type 275 Watt sun lamps. With air from a blower passing through the test chamber the temperature equilibrates at about 145°F. This subjects the rubber samples to ultraviolet light and is considerably more quantitative than exposure to sun light and visual observation of the color.

The color change is a measure of the color stability. The color change is measured on a Photovolt Reflectance meter Model 610 which measures percent reflectance, referenced against both a light and a dark standard, said standards being those of the National Bureau of Standards for 100% and 0.0% reflectance, respectively. Measurements are taken at 0, 2, 8 and 24 hours and recorded as percent reflectance. The above-described ultraviolet aging and the above method of determining percent reflectance are sometimes referred to herein as "test procedure A". The designation of the respective oils has been applied to the rubber samples for convenience.

| Rubber Sample | A | B |
|---|---|---|
| Treatment | no acid | 25 Wt. % HF |
| % by Weight Aromatics | 45 | 43 |
| % Polar Aromatics | 5 | 2.7 |
| Hours | % Reflectance | |
| 0 | 140 | 144 |
| 2 | 112 | 128 |
| 8 | 67 | 98 |
| 24 | 28 | 66 |
| | % Decrease in Reflectance | |
| | 80 | 54 |

Even considering that Sample B has 2% less total aromatics than Sample A, this is substantially the same aromatic content and cannot account for the vast improvement (32%) of Sample B over Sample A. However, upon comparing the polar aromatic content of the two oils, it can be seen that the HF treatment is very selective for polar aromatic compounds, e.g., heterocyclic compounds containing sulfur or nitrogen in the ring.

EXAMPLE III

A naphthenic-base mineral oil containing about 45% aromatics and corresponding to oil A of Example II is extracted with furfural to obtain an 85% raffinate containing 37.7% aromatics. The properties of this oil are as follows:

| Treatment | Furfural Extraction |
|---|---|
| Viscosity SUS at 210°F. | 59 |
| % by Weight polar aromatics | 2.5 |
| % by Weight Aromatics | 37.7 |
| Viscosity/Gravity Constant | .869 |
| Carbon atom type, % | |
| $C_A$ | 14 |
| $C_N$ | 41 |
| $C_P$ | 45 |

A rubber sample is prepared from the raffinate according to the formulation employed in Example II and the color stability of the rubber compound subjected to the same test as the rubber compounds of Example II and the percent reflectance measured as in Example II.

| Rubber Sample Treatment | Furfural extraction |
|---|---|
| % by Weight Aromatics | 37.7 |
| Hours | % Reflectance |
| 0 | 141 |
| 2 | 130 |
| 8 | 106 |
| 24 | 78 |
| | % Decrease in Reflectance |
| | 44 |

By a comparison of the percent decrease in reflectance of the rubber Sample B of Example II and the Sample of Example III, it can be seen that a rubber extended with the oil containing 43 weight percent aromatics produced by anhydrous HF treatment has color stability approaching a rubber extended with an oil containing 37.7 weight percent aromatics but produced by furfural extraction.

The improvements to be found in the present invention are:

| Nature of Oil | Constant | Improvement |
|---|---|---|
| Anhydrous HF treated | Aromatic content same as furfural raffinate oil | Rubber containing the HF treated oil has superior color stability to rubber containing the raffinate. |
| Anhydrous HF treated | Color stability of rubber compounded from oil the same as that for rubber made from furfural raffinate oil. | Higher aromatic content of HF treated oil thus easier processability with rubber. |

The results here are unexpected since the prior art has understood that aromatic content per se results in poor color properties.

Where the nature of the charge stock, and the desired aromatic content of the contacted product in the process according to the invention, are such that minimum removal of total aromatics for a given extent of color and non-staining improvement is desired, it may be desirable to avoid using solvent extraction at any stage of the process. However, the benefits according to the invention are obtained in substantial degree when solvent extraction is employed in addition to the contacting with hydrogen fluoride and, as has been described herein, such a process combining solvent extraction and acid treatment can be less costly than acid treatment alone.

Rubbery materials which can be compounded with mineral oils according to the invention include natural rubber and synthetic rubber-like polymers of butadiene or its derivatives, e.g., methyl butadiene, dimethyl butadiene, pentadiene, chloroprene, etc. and synthetic rubber-like copolymers of butadiene or its derivatives with other unsaturated organic compounds such as styrene, acrylonitrile, vinyl chloride, acrylic acid, methacrylic acid, acrolein, methyl isopropenyl ketone, vinyl ethyl ether, vinyl acetylene, etc.

The mineral oil employed according to the invention can be used as a plasticizer for ordinary synthetic rubber polymers, or as an extender for a high Mooney viscosity synthetic rubber polymer. In ordinary polymer compositions, generally the amount of oil used will be in the approximate range from 5 to 50 parts by weight of oil per 100 parts of polymer. In the extended polymer compositions, where the Mooney (ML-4) viscosity of the polymer, prior to addition of any extender, is generally within the approximate range from 80 to 240, the amount of oil used will generally be in the approximate range from 10 to 120 parts of oil per 100 parts of polymer, and preferably in the range from 20 to 80 parts of oil per 100 parts of polymer. In natural rubber compositions, the amount of oil used will generally be in the approximate range from 5 to 50 parts by weight of oil per 100 parts of polymer.

For the significance of the ultraviolet absorptivity at 260 millimicrons (the 260 uva) see Ziegler, S. B. et al., "Proceedings of the International Rubber Conference", Washington D. C., Nov. 1959, p. 432–438.

The invention claimed is:

1. Process for preparing rubber compositions which comprises admixing a rubber selected from the group consisting of natural rubber, homopolymers of conjugated diolefins, and copolymers of conjugated diolefins with ethylenically unsaturated monomers, with mineral oil having at least 10 Wt. % aromatic compounds which has been obtained by
    a. mixing a mineral oil starting material with an acidic reagent comprising anhydrous hydrogen fluoride in amount from 10 to 40 percent by weight of said starting material; thereby to form an acid phase insoluble in said mineral oil and containing components extracted from said starting material, and an oil phase comprising unextracted components of said starting material and containing dissolved acidic material,
    b. separating said phase from said oil phase,
    c. mixing said oil phase with an alkaline reagent to neutralize said dissolved acidic material and form neutralization products, and
    d. separating said neutralization products from said oil phase.

2. Process according to claim 1 wherein said mineral oil starting material is a raffinate from the extraction of a petroleum distillate with an aromatic selective solvent.

* * * * *